(12) United States Patent
Ganji

(10) Patent No.: US 12,395,007 B1
(45) Date of Patent: Aug. 19, 2025

(54) SOLAR POWER SYSTEM WITH ELECTRIC ENGINE

(71) Applicant: Kazem Ganji, Norman, OK (US)

(72) Inventor: Kazem Ganji, Norman, OK (US)

( * ) Notice: Subject to any disclaimer, the term of this patent is extended or adjusted under 35 U.S.C. 154(b) by 0 days.

(21) Appl. No.: 18/423,460

(22) Filed: Jan. 26, 2024

Related U.S. Application Data

(63) Continuation-in-part of application No. 18/212,529, filed on Jun. 21, 2023, now abandoned.

(60) Provisional application No. 63/356,830, filed on Jun. 29, 2022.

(51) Int. Cl.
*H02J 9/06* (2006.01)
*H02J 7/35* (2006.01)
*H02P 9/02* (2006.01)

(52) U.S. Cl.
CPC .................. *H02J 9/06* (2013.01); *H02J 7/35* (2013.01); *H02P 9/02* (2013.01)

(58) Field of Classification Search
CPC .................. H02J 9/06; H02J 7/35; H02P 9/02
See application file for complete search history.

(56) References Cited

U.S. PATENT DOCUMENTS

| | | | |
|---|---|---|---|
| 1,560,947 | A | 11/1925 | Skelton |
| 3,338,682 | A | 8/1967 | Lentz et al. |
| 3,647,394 | A | 3/1972 | Wetch et al. |
| 3,719,881 | A | 3/1973 | Shibata et al. |
| 3,853,484 | A | 12/1974 | Sudar et al. |
| 3,996,902 | A | 12/1976 | Ri et al. |
| 4,313,523 | A | 2/1982 | Copen |
| 5,212,431 | A | 5/1993 | Origuchi et al. |
| 5,680,908 | A | 10/1997 | Reed |
| 5,689,174 | A | 11/1997 | Pacheco, Sr. |
| 5,740,669 | A | 4/1998 | Kinugasa et al. |
| 5,813,224 | A | 9/1998 | Rao et al. |
| 6,734,645 | B2 | 5/2004 | Auerbach |
| 6,813,882 | B2 | 11/2004 | Hepburn et al. |
| 6,874,316 | B2 | 4/2005 | Nakatani |
| 7,033,547 | B1 | 4/2006 | Ichikawa |
| 7,095,126 | B2 | 8/2006 | McQueen |
| 7,134,517 | B1 | 11/2006 | Kaiser |
| 7,337,607 | B2 | 3/2008 | Hou et al. |
| 7,458,208 | B1 | 12/2008 | Dando, Jr. et al. |
| 7,566,423 | B2 | 7/2009 | Evans-Beauchamp |
| 7,876,065 | B2 | 1/2011 | Grant, Sr. |
| 8,439,140 | B1 | 5/2013 | Amortegui |
| 8,469,133 | B2 | 6/2013 | Kaiser |
| 8,601,800 | B2 | 12/2013 | Ojima |

(Continued)

FOREIGN PATENT DOCUMENTS

| | | |
|---|---|---|
| CA | 2689404 | 4/2011 |
| CN | 113541443 | 10/2021 |

(Continued)

OTHER PUBLICATIONS

Solar Power System With Generator Backup—https://solarpowerplanetearth.com/solarwithgeneratorbackup.html.
Tesla Model S—https//en.wikipedia.org/wiki/Tesla_Model_S.

*Primary Examiner* — Robert L Deberadinis
(74) *Attorney, Agent, or Firm* — Dennis D. Brown; Brown Patent Law, P.L.L.C.

(57) ABSTRACT

A solar power system which includes an electric engine power generator assembly to produce and store electrical energy as needed, when solar energy is not available or the level of solar energy is insufficient, to maintain a full or substantially full stored power charge level.

5 Claims, 4 Drawing Sheets

(56) References Cited

U.S. PATENT DOCUMENTS

| | | |
|---|---|---|
| 8,639,406 B2 | 1/2014 | Avery |
| 8,671,661 B2 | 3/2014 | Nagaoka et al. |
| 8,853,869 B2 | 10/2014 | Nikolic |
| 8,904,756 B2 | 12/2014 | Yoda et al. |
| 8,925,298 B2 | 1/2015 | Pekrul et al. |
| 8,978,360 B2 | 3/2015 | Cavataio et al. |
| 8,991,163 B2 | 3/2015 | Olivier |
| 8,994,215 B1 | 3/2015 | Davis |
| 9,037,334 B1 | 5/2015 | Cole |
| 9,138,686 B2 | 9/2015 | Kim et al. |
| 9,206,729 B2 | 12/2015 | Mungas et al. |
| 9,878,616 B2 | 1/2018 | Dalum |
| 10,903,780 B2 | 1/2021 | Wilson |
| 10,958,206 B1 | 3/2021 | Whittaker |
| 2004/0060751 A1 | 4/2004 | Frank |
| 2006/0290138 A1 | 12/2006 | Kuo et al. |
| 2009/0139218 A1 | 6/2009 | Davie et al. |
| 2010/0006351 A1 | 1/2010 | Howard |
| 2010/0184560 A1 | 7/2010 | Campbell |
| 2010/0199635 A1 | 8/2010 | Akama et al. |
| 2011/0049892 A1 | 3/2011 | Ross |
| 2011/0148354 A1 | 6/2011 | Wenger et al. |
| 2011/0215587 A1 | 9/2011 | Lee et al. |
| 2011/0234036 A1 | 9/2011 | Torres |
| 2011/0248512 A1 | 10/2011 | Lee |
| 2012/0091731 A1 | 4/2012 | Nelson |
| 2012/0139486 A1 | 6/2012 | Holland |
| 2012/0255798 A1 | 10/2012 | Palmer |
| 2012/0299526 A1 | 11/2012 | Lambert |
| 2013/0181516 A1 | 7/2013 | Phan |
| 2014/0250871 A1 | 9/2014 | Yasoshina et al. |
| 2014/0252774 A1 | 9/2014 | Boaventura-Delanoe |
| 2017/0082038 A1 | 3/2017 | Dudar |
| 2017/0306893 A1 | 10/2017 | Leone |
| 2018/0011483 A1 | 1/2018 | Ricci |
| 2018/0072306 A1 | 3/2018 | Yamakaki |
| 2018/0219406 A1 | 8/2018 | Prieto |
| 2018/0328473 A1 | 11/2018 | David et al. |
| 2018/0354492 A1 | 12/2018 | Meyer |
| 2019/0023257 A1 | 1/2019 | Doering |
| 2019/0126759 A1 | 5/2019 | Miller |
| 2019/0225090 A1 | 7/2019 | Prieto |
| 2021/0111615 A1 | 4/2021 | Mitri |
| 2021/0143724 A1 | 5/2021 | Jain et al. |

FOREIGN PATENT DOCUMENTS

| | | |
|---|---|---|
| DE | 000004031920 | 4/1992 |
| FR | 2672446 | 8/1992 |

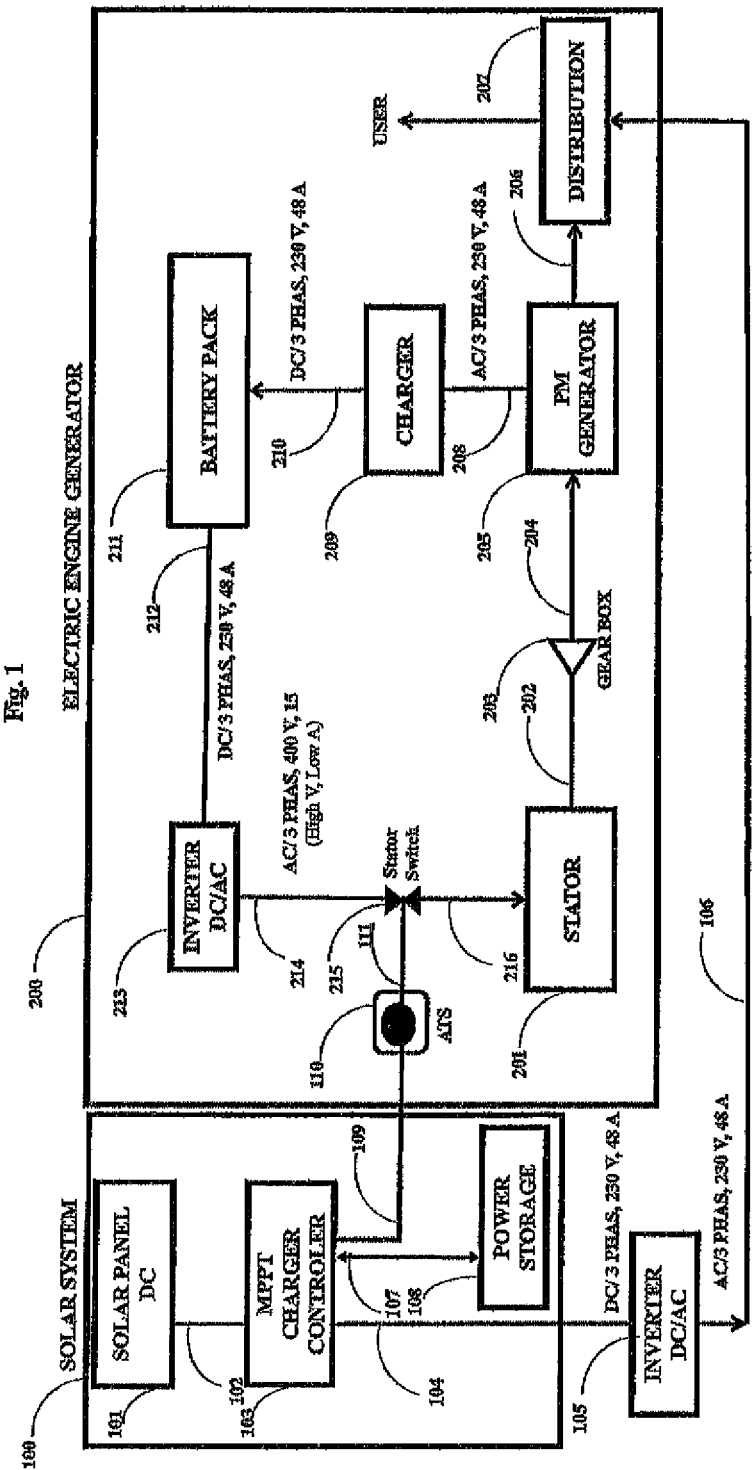

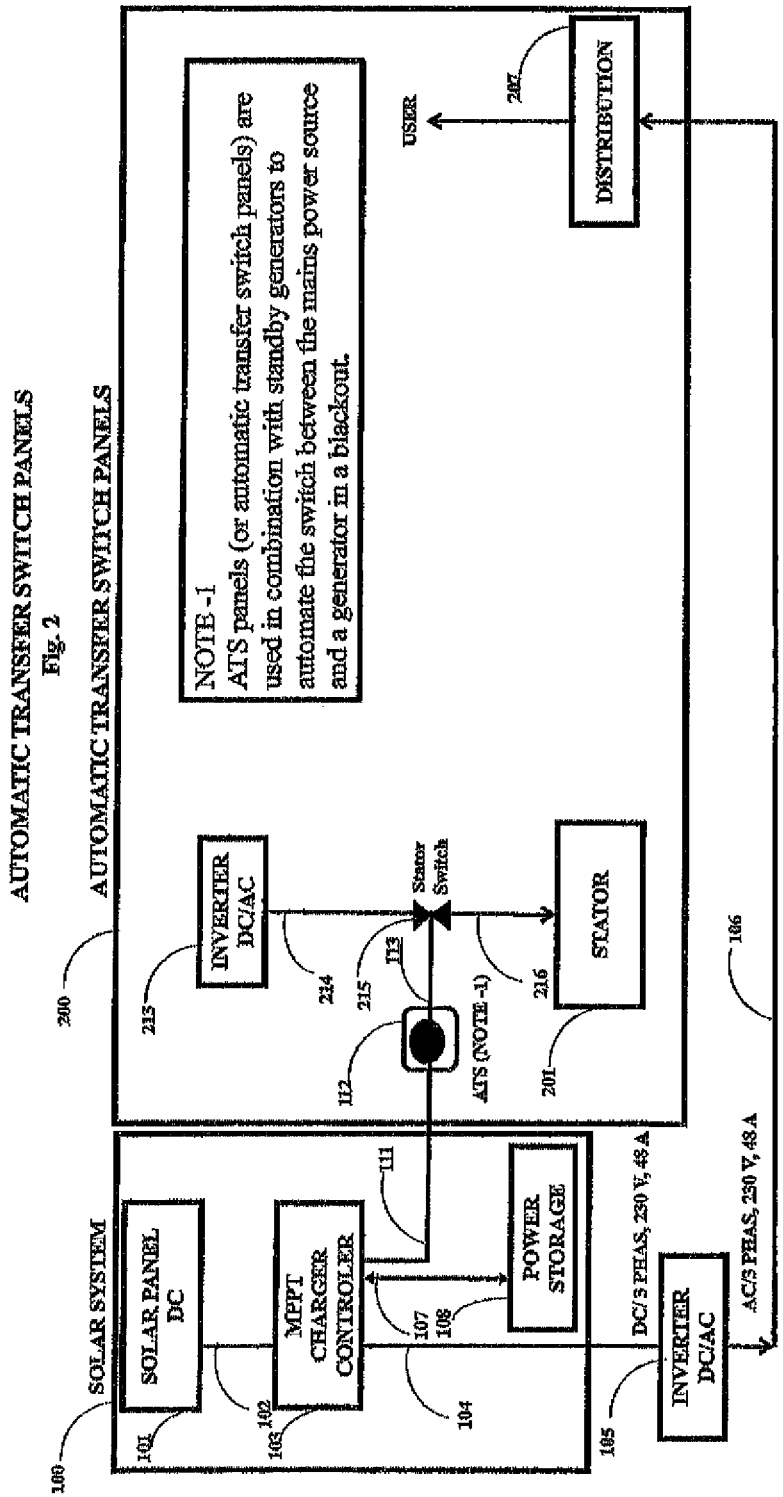

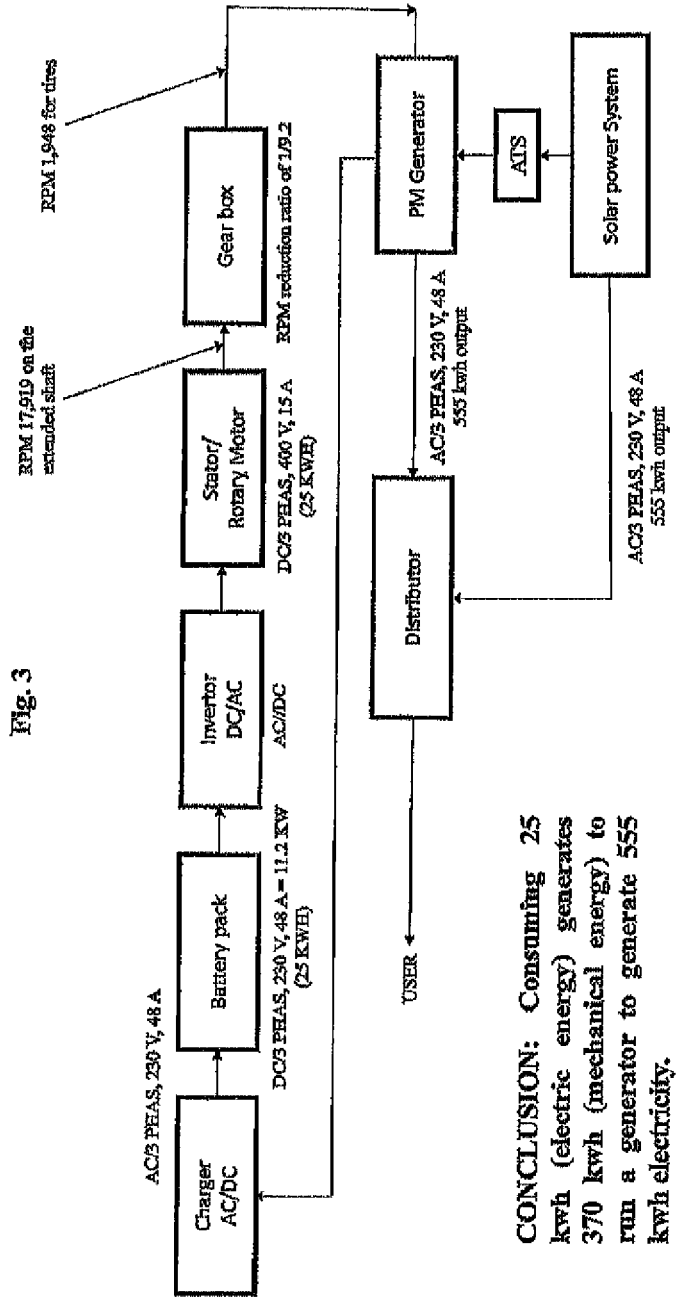
Fig. 3 SOLAR POWER WITH SYSTEM ELECTRIC ENGINE OVERALL PERFORMANCE
CONCLUSION: Consuming 25 kwh (electric energy) generates 370 kwh (mechanical energy) to run a generator to generate 555 kwh electricity.

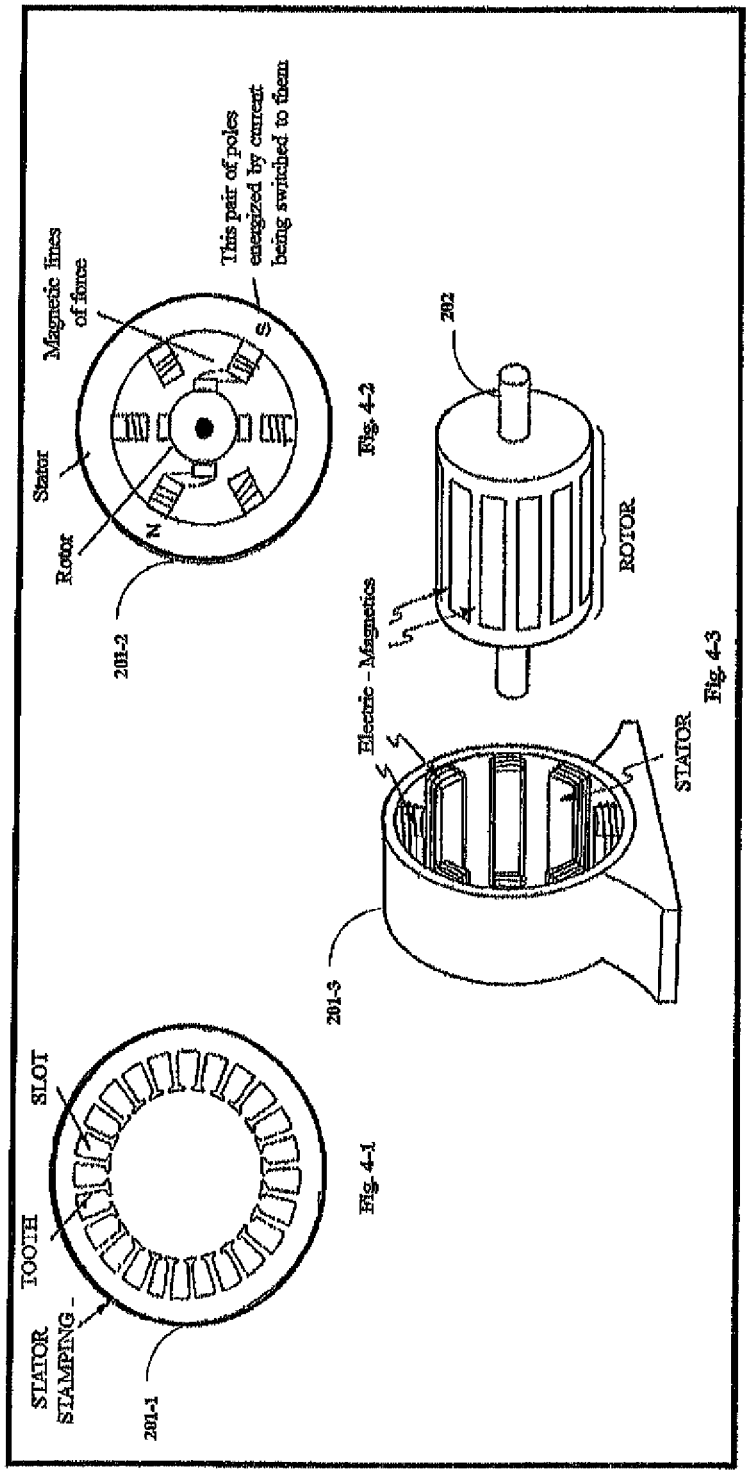

SOLAR POWER SYSTEM WITH ELECTRIC ENGINE

RELATED CASES

This application is a continuation-in-part of pending U.S. patent application Ser. No. 18/212,529 filed Jun. 21, 2023 claiming the benefit of U.S. Provisional Patent Application No. 63/356,830 filed Jun. 29, 2022, each of which is incorporated herein by reference as if fully set forth at this point.

FIELD OF THE INVENTION

The present invention relates to a solar power system having a solar power system electric engine generator back up for producing power when solar energy is not available, or the available solar energy is reduced or not sufficient.

BACKGROUND OF THE INVENTION

Existing solar power systems produce power by converting renewable sun energy to voltage in solar panels by electron motion at high temperature. Excess electrical energy can be stored on the grid, or power storage for use when solar energy is not available or is reduced. However, at night, during winter months, and at other times when it is cold, windy, and/or rainy and solar energy is not available or is reduced, the existing solar power systems currently available in the art are not reliable power providers. A need therefore exists for an improved solar power system.

SUMMARY OF THE INVENTION

The present invention satisfies the needs and alleviates the problems mentioned above. The advantage of the invention is that solar power with an electric engine generator generates electrical power to the user to use at all times throughout the entire year. The solar power produced electrical power can be directly used for power needs, and a portion power can be delivered to power storage when the sunshine energy is available. An electric engine generator delivers electrical power directly to the user to meet power needs, and to charge a battery pack when the sunshine energy is not available. An automatic transfer switch panel (ATS panel) is used in combination with the generator to automate the switch between the mains solar power system and the electric engine generator when solar energy is not available.

In one aspect, there is provided an apparatus for producing and storing electrical energy which preferably comprises: (a) a solar power system which has one or more solar energy receivers and produces electrical power from the solar energy; (b) a delivery system which delivers at least a portion of the electrical power produced by the solar power system to one or more electrically powered devices and/or systems; (c) one or more power storage devices which receives and stores at least a portion of any of the electrical power produced by the solar power system which is not delivered to the one or more electrically powered devices and/or systems; and (d) an electrical power generator system.

The electrical power generator system preferably comprises: (i) a battery pack, (ii) a stator which receives electrical power from the battery pack to rotate a multi pole, induction, or permanent magnetic (PM) rotary motor, the rotary motor having a motor shaft extending therefrom which is driven by the rotary motor, (iii) a multi pole, induction, or PM electrical generator which generates electrical power, at least a portion of the electrical power generated by the electrical generator being delivered to the one or more electrically powered devices and/or systems and at least a portion of any of the electrical power generated by the electrical generator which is not delivered to the one or more electrically powered devices and/or systems being delivered to charge the battery pack, the electrical generator having a generator shaft extending therefrom which drives the electrical generator, and (iv) a gear assembly which links the motor shaft with the generator shaft and causes the generator shaft to rotate at a rotational speed which is different from a rotational speed of the motor shaft.

In another aspect, the apparatus just described preferably further comprises an automatic transfer switch (ATS) which starts the electrical power generation system when solar energy is not available and stops the electrical power generation system when solar energy is available.

In another aspect, there is a solar power system which delivers electricity to the user when sunshine is available. However, in addition, when there is no sunshine, an electric engine generator can generate power, so the user receives electricity all the time, during the entire year.

The solar power system with electric engine preferably comprises: (i) a maximum power point tracking, MPPT solar charge controller device 103. The charge controller 103 regulates the amperage and voltage that is delivered to the distribution 207 and any excess power is delivered to the power storage 108. An automatic transfer switch panel, ATS panel, 110 is typically installed so that it connects to charger control 103 via line 109 and stator switch 215 via line (111) to start the electric engine generator when solar energy is not available and stop the electric engine generator when solar energy is available. This ensures that the electrical system continues to operate even when there is no solar power available.

A charger 209 which receives power from the electric engine generator 205 via line 208 converts AC to Direct Current (DC) to the battery pack 211 via line 210 to restore the used-up electrolyte. When all the electrolyte of the battery is restored, the current supply will stop to prevent overloading.

As seen in FIGS. 1 & 4, the electric engine generator system preferably comprises a battery pack 211, that provides power to the stator 201 (FIG. 4-1), via line 216. The stator 201 includes a three phase multi pole, induction, or permanent magnetic motor (FIG. 4-2). During operation, a current is applied through the stator 201, which induces a magnetic field and leads to the rotation of the rotor (FIG. 4-3). The rotational speed of the shaft and the applied torque depends on the operating frequency and the number of pole pairs in the motor's windings in the stator that produces power hp, torque power, f-lb./f and speed, and rpm on the rotary motor shaft 202 as mechanical energy.

As seen in FIG. 3, as an example, a high voltage current AC 400 V, 15 A, at 25 kwh rate is applied through the stator which induces a magnetic field and leads to the rotation of the rotor preferably rated as a 3 phase, four pole, PM rotary motor that produces 378 kw (514 HP) peak power, 401 kw (545 HP) ludicrous mode, 680 Nm (500 ft*lb./f), 18,122 RPM on motor shaft 202 as mechanical energy that can run a 3 phase, four pole, PM generator to generate 567 kw (the ratio of a 3 phase PM generator kw generate/a 3 phase PM rotary motor that runs the generator in kw=1.5). A gain of 567 kw renewable electricity.

In another aspect there is provided a solar power system with electric engine apparatus for producing electricity which is or can be delivered to the user for direct use(s), stored in storage power by charging the main battery pack, which preferably comprises: (a) a solar power system which has one or more solar energy receivers and produces electrical power from the solar energy; (b) one or more power storage elements which receive and store at least a portion of the electrical power produced by the solar power system; and (c) an electric engine generator that generates required power for use(s) as needed, and charging the main battery pack.

The electric engine system preferably comprises: (i) a stator 201 which receives electrical power from the main battery pack 211 which is charged by PM generator 205. The stator 201 having a motor shaft 202 extending therefrom which is driven by the stator 201, (ii) a PM generator 205 which generates electrical power delivered to distribution panel 207 for direct use(s), the PM generator 205 having a generator shaft 204 extending therefrom which drives the PM generator 205, (iii) a gear assembly 203 which links the motor shaft 202 with the generator shaft extend 204 and causes the generator shaft to rotate at a rotational speed which is different from the rotational speed of the motor shaft, and (iv) an automatic transfer switch panel, ATS panel, used in combination with the generator to automate the switch between the main solar power system and the generator when the solar energy is not available, start or stop the electric engine generator 200 to run or shutdown.

Further aspects, features, and advantages of the present invention will be apparent to those in the art upon examining the accompanying drawings and upon reading the following Detailed Description of the Preferred Embodiments.

BRIEF DESCRIPTION OF THE DRAWINGS

FIG. 1 schematically illustrates an embodiment 100 & 200 of the Solar Power System with Electric Engine provided by the present invention.

FIG. 2 schematically illustrates an embodiment 100 & 200 of the Solar Power System with Electric Engine-Automatic Transfer Switch panel provided by of the present invention.

FIG. 3 schematically illustrates an embodiment 100 & 200 of the Solar Power System with Electric Engine-Overall Performance provided by of the present invention.

FIG. 4 schematically illustrates an embodiment 201 of the basic electric components of an AC motor provided by the present invention.

DETAILED DESCRIPTION OF THE PREFERRED EMBODIMENTS

When the sunshine touches solar panels, energy from the sunlight is absorbed by the PV cells in the panel. This energy creates electrical charges that move in response to an internal electrical field in the cell, causing electricity to flow. During the night and when sunshine is not available, the system does not produce electricity.

The inventive solar power system with electric engine preferably comprises a new or existing solar power system 100, an electric engine assembly 200, a main battery pack 211, and an ATS panel 110.

As seen in FIG. 1, the solar power system 100 preferably comprises: one or more solar panels or other solar energy receiver(s) 101; a charger controller 103 fed by a line 102 from the solar panel(s) 101; a power storage 108, fed by line 107 from the charge controller 103; an invertor 105 fed by line 104 from the charge controller 103; a distribution panel 207 fed by line 106 to the user of (i.e., the device(s) and/or system(s) using) the electrical power; and the power storage 108 being fed by line 107 from the charge controller 103.

As seen in FIG. 1, the electric engine assembly 200 for the solar power system 100 preferably comprises: a stator 201 which receives power via a feed line 216 from the battery pack 211; a drive shaft 202 of the rotary motor 201 which links to a gear box 203; a PM electrical generator 205; a generator power shaft 204 which extends from the gear box 203 to the generator 205; and a line 206 which delivers electrical power from the generator 205 to the distribution panel 207.

The electric engine assembly 200 preferably further comprises a stator switch 215 fed in by ATS 110 via line 111 for running the electric engine system when solar energy is not available.

In the inventive system, the solar power system 100, a maximum power point tracking, MPPT, solar charge controller device 103 regulates the amperage and voltage that is delivered to distribution 207 and any excess power is delivered to the power storage 108. An automatic transfer switch panel, ATS panel 110, is typically installed so that it connects to charger control 103 via line 109 and to stator switch 215 via line (111) to start the electric engine generator when solar energy is not available and stop electric engine generator when solar energy is available.

As seen in FIG. 1, the solar power system 100 sends power to distribution panel 207 via line 106 from charger controller 103 that delivers power to the user for one or more use(s), and to storage power 108 via line 107, when sunshine energy is available.

As seen in FIG. 1, the electric engine 200 sends power to the distribution panel 207 via line 206 from PM generator 205 that delivers power the user for one or more use(s) and to the battery pack 211 via line 210 from charger 209 that charges from generator 205 via line 208 to keep the battery fully charged, and to supply power to the stator 201 via line 216 when the sunshine energy is not available.

PM generator 205 produces electrical power which is delivered to distribution panel 207 and then to the user for one or more use(s), the PM generator 205 having a generator shaft extending 204 therefrom which drives the PM generator 205. Gear assembly 203 links the rotary motor shaft 202 extending therefrom with the generator shaft 204 and causes the generator shaft 204 to rotate at a rotational speed which is different from the rotational speed of the motor shaft 202.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within the invention as defined in the claims.

What is claimed is:

1. An apparatus for producing and storing electrical energy comprising:

a solar power system which has one or more solar energy receivers and produces electrical power from the solar energy;

a delivery system which delivers at least a portion of the electrical power produced by the solar power system to one or more electrically powered devices and/or systems;

one or more power storage devices which receives and stores at least a portion of any of the electrical power produced by the solar power system which is not delivered to the one or more electrically powered devices and/or systems;

an electrical power generator system which comprises a battery pack, a stator which receives electrical power from the battery pack to rotate a multi pole, induction, or permanent magnetic (PM) rotary motor, the rotary motor having a motor shaft extending therefrom which is driven by the rotary motor, a multi pole, induction, or PM electrical generator which generates electrical power, at least a portion of the electrical power generated by the electrical generator being delivered to the one or more electrically powered devices and/or systems and at least a portion of any of the electrical power generated by the electrical generator which is not delivered to the one or more electrically powered devices and/or systems being delivered to charge the battery pack, the electrical generator having a generator shaft extending therefrom which drives the electrical generator, and a gear assembly which links the motor shaft with the generator shaft and causes the generator shaft to rotate at a rotational speed which is different from a rotational speed of the motor shaft; and an automatic transfer switch (ATS) which starts the electrical power generation system when solar energy is not available and stops the electrical power generation system when solar energy is available.

2. The apparatus of claim 1 further comprising the electrical power generation system including an inverter which converts direct current power from the battery pack to alternating current, three phase electrical power which is received by the stator.

3. The apparatus of claim 2 further comprising the alternating current, three phase electrical power received by the stator from the inverter being a three phase, 400 volt, 15 amp alternating current.

4. The apparatus of claim 1 further comprising the rotary motor being a permeant magnetic (PM) rotary motor.

5. The apparatus of claim 1 further comprising the electrical generator being an alternating current, 3 phase, multi pole, induction, or permeant magnetic (PM) electrical generator.

* * * * *